UNITED STATES PATENT OFFICE.

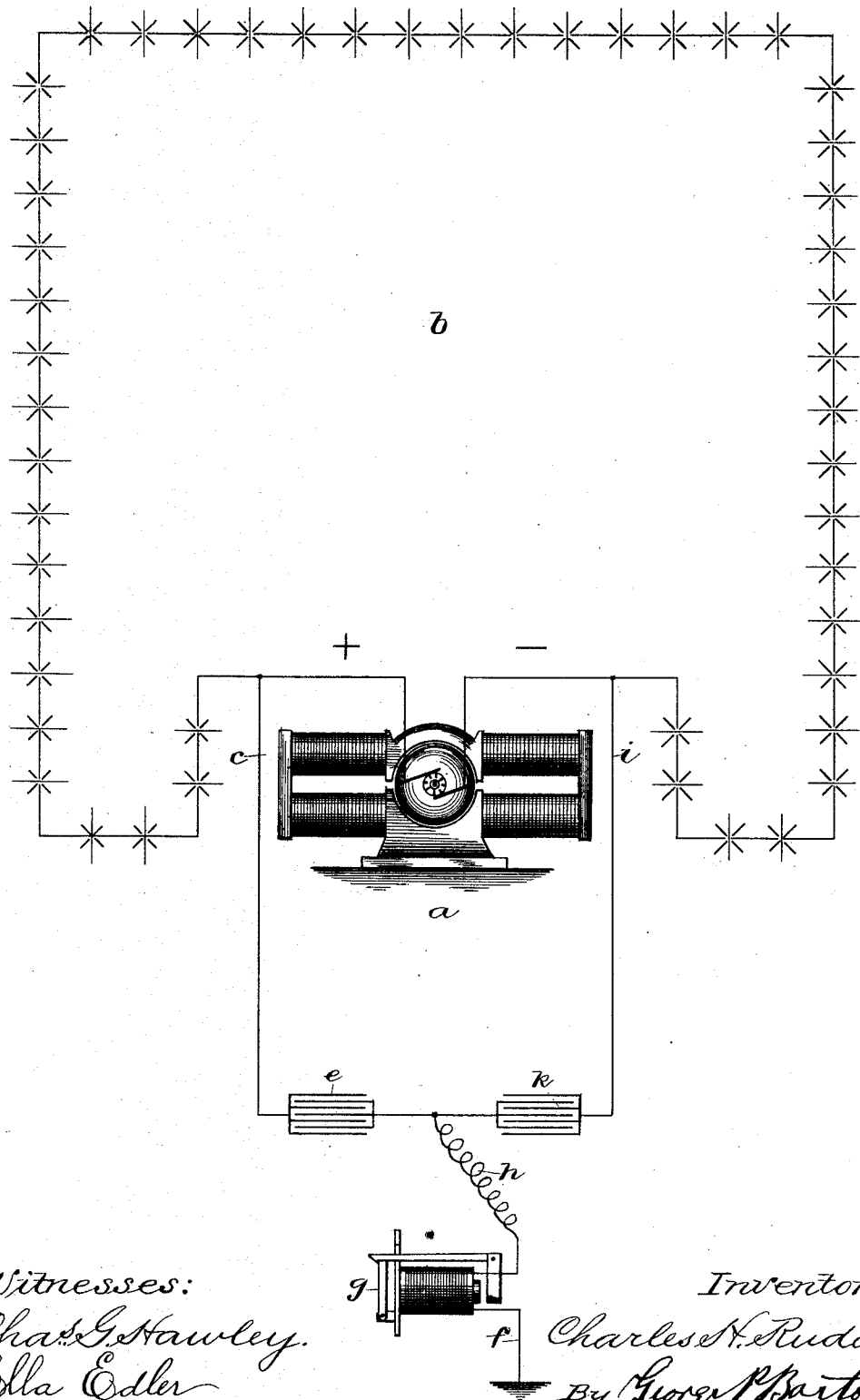

CHARLES H. RUDD, OF EVANSTON, ASSIGNOR TO THE WESTERN ELECTRIC COMPANY, OF CHICAGO, ILLINOIS.

ELECTRIC SIGNAL DEVICE.

SPECIFICATION forming part of Letters Patent No. 504,752, dated September 12, 1893.

Application filed December 10, 1888. Serial No. 293,123. (No model.)

*To all whom it may concern:*

Be it known that I, CHARLES H. RUDD, a citizen of the United States, residing at Evanston, in the county of Cook and State of Illinois, have invented a certain new and useful Improvement in Electric Signal Devices, (Case No. 5,) of which the following is a full, clear, concise, and exact description, reference being had to the accompanying drawing, forming a part of this specification.

The object of my invention is to provide ready means for automatically indicating any accidental ground connection which may be formed upon an electric arc light circuit or any highly insulated circuit, while at the same time the potential of the circuit between the different poles of the dynamo is rendered more uniform.

My invention consists in providing a circuit to ground preferably from both sides of the dynamo electric machine through an annunciator or other electro magnetic indicating device, high resistance being preferably included in circuit with the signal device. The condensers, when two are used as is especially desirable, are included in a shunt circuit connecting with the arc circuit on different sides of the dynamo, a ground branch including preferably high resistance together with the electro magnetic signaling device being connected between the condenser with the shunt circuit.

My invention is illustrated in the accompanying drawing in which the dynamo electric machine $a$ is included in the arc circuit $b$. From the side of the dynamo marked + the wire $c$ is connected through condenser $e$ to ground wire $f$. The annunciator $g$ is included in this ground wire together with resistance $h$. From the side of the dynamo marked − the wire $i$ is connected through condenser $k$ to said ground wire $f$. The capacity of the condensers may be each of any desired amount, the capacity of each, however, being preferably the same, say one microfarad.

The electro magnetic signal device $g$ is preferably an annunciator having a visual signal adapted to be thrown so as to indicate that it has been operated until restored to position. The resistance $h$ may be of say one hundred thousand ohms. Whenever a ground circuit is closed at any point of the lamp circuit $b$, the condensers will be charged unequally and during the charging of the condensers sufficient current will be sent through the annunciator to operate the same. Theoretically the charge of the condensers would be equal and opposite if the ground connection were made at the neutral point of the circuit. Practically, however, the neutral point or center of resistance of the circuit $b$ changes when the lamps are burning so that the two condensers would not remain thus equally, oppositely charged for any considerable period of time. Therefore, under all ordinary conditions the annunciator will be operated whenever an objectionable leak occurs on the lamp circuit $b$. The shunt wire around the working circuit containing the two condensers may be considered as two arms of a Wheatstone bridge; the lamp circuit $b$ may be considered as the other two arms, the ground branch $f$ may be considered as the bridge wire and the dynamo as the test battery.

It is evident that a simple branch connection on one side of the machine through a condenser, an annunciator and resistance to ground might be operative for indicating an accidental leak or ground upon the circuit. I prefer, however, the two condensers connected as shown and described. The object of the resistance $h$ which is included in the circuit with the signal device $g$ is to prevent the possibility of a dangerous shock being received by one who should make connection through himself from the lamp circuit to ground.

It is evident that my invention would be operative without the resistance $h$; in fact the annunciator would respond more promptly if the resistance $h$ were omitted from the ground circuit $f$; therefore, if the lamp circuit were of low potential it would be well to omit the said resistance. The shunt circuit around the working circuit including a condenser tends to make the potential of the current between the different poles of the machine more uniform. The objectionable effects resulting from induction, which have heretofore caused so much trouble when arc circuits are run near telephone circuits, would be lessened, if not entirely obviated. It will thus be seen that the simple shunt circuit including condensers, would be of advantage, though the branch wire *f* were omitted. The branch wire, *f*, however, is not detrimental to the operation of my invention as an equalizer of potential.

Having thus described my invention, I claim as new and desire to secure by Letters Patent—

1. The combination with a lamp circuit of the shunt circuit connected with different sides of the dynamo electric-machine, said shunt circuit including two condensers of equal capacity and a ground branch connected between the condensers with said shunt circuit and an electro magnetic signaling device included in said ground branch, whereby on closing the lamp circuit to ground at any point, the signaling device will be operated, substantially as and for the purpose specified.

2. The combination with an electric arc circuit, of a branch circuit to ground from one side of the dynamo electric machine, a condenser included in said branch circuit and a signaling device included in the said branch containing the condenser.

3. The combination with an electric arc circuit of a high resistance branch circuit to ground from one side of the dynamo electric machine, a condenser included in said branch circuit and a signaling device included in the said branch containing the condenser.

4. The combination with the lamp circuit including the dynamo electric machine, of branch wires, one from each pole of the dynamo, each including a separate condenser, said branches being united in a ground branch and an annunciator included in said branch.

5. The combination with the lamp circuit including the dynamo electric machine, of branch wires, one from each pole of the dynamo, each including a separate condenser, said branches being united in a ground branch and an annunciator included in said branch with high resistance.

6. The combination with a dynamo electric machine and a working circuit, of a connection to ground containing an indicating device and a device adapted to create a back electro-motive force equal to the electro-motive force of the machine upon the passage of a current; whereby only a momentary current will flow to ground to actuate said indicating device, substantially as described.

In witness whereof I hereunto subscribe my name this 10th day of November, A. D. 1888.

CHARLES H. RUDD.

Witnesses:
  GEORGE P. BARTON,
  ELLA EDLER.